UNITED STATES PATENT OFFICE.

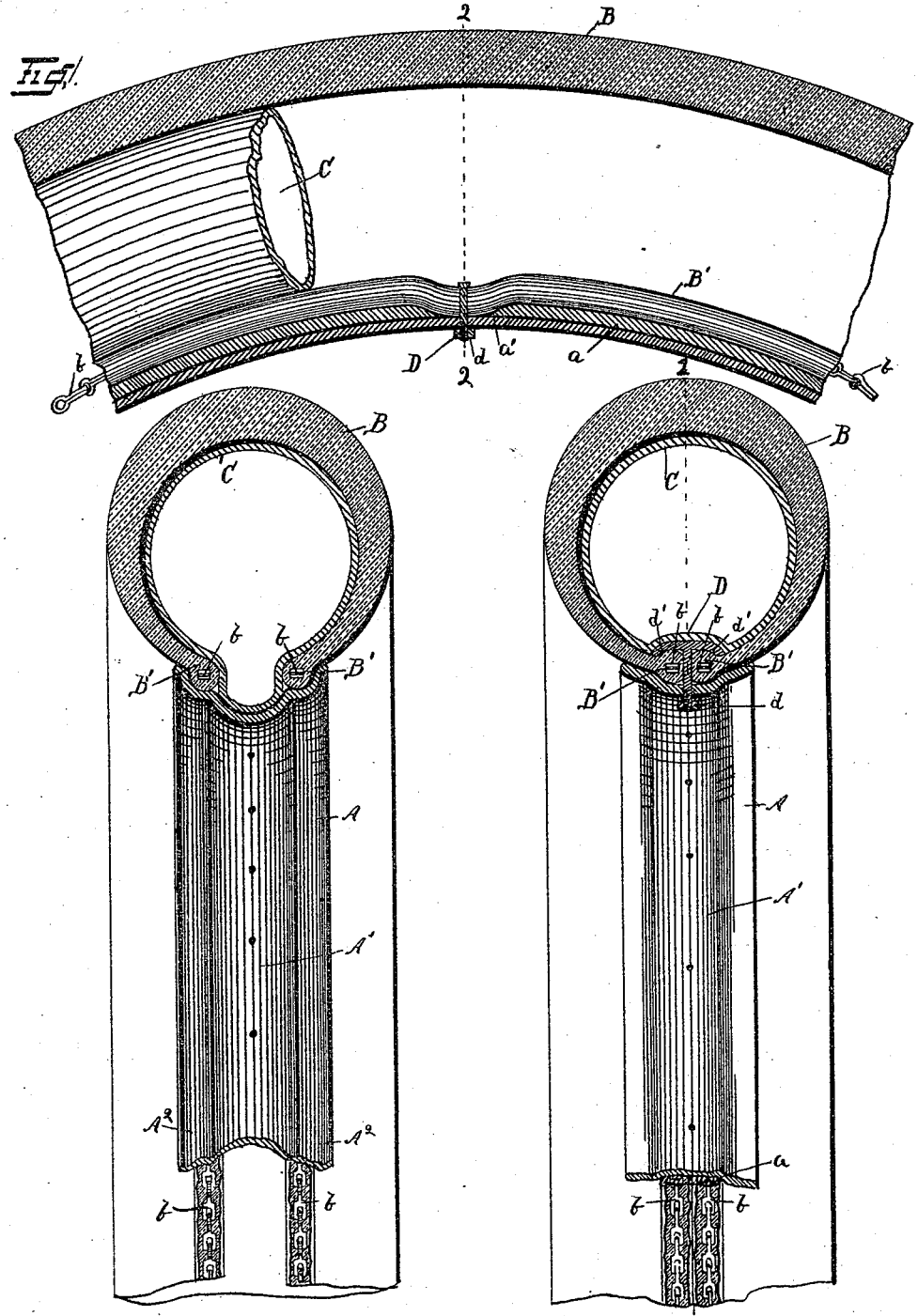

JOSEPH G. MOOMY, OF ERIE, PENNSYLVANIA, ASSIGNOR OF ONE-HALF TO THOMAS BROWN, OF SAME PLACE.

PNEUMATIC TIRE.

SPECIFICATION forming part of Letters Patent No. 501,290, dated July 11, 1893.

Application filed March 31, 1893. Serial No. 468,492. (No model.)

*To all whom it may concern:*

Be it known that I, JOSEPH G. MOOMY, a citizen of the United States, residing at Erie, in the county of Erie and State of Pennsylvania, have invented certain new and useful Improvements in Pneumatic Tires; and I do hereby declare the following to be a full, clear, and exact description of the invention, such as will enable others skilled in the art to which it appertains to make and use the same.

This invention relates to pneumatic tires, and consists in certain improvements in the construction thereof as will be hereinafter fully described and pointed out in the claims.

The invention is illustrated in the accompanying drawings as follows:

Figure 1 is a longitudinal section of the tire and felly on the line 1—1 in Fig. 2. Fig. 2 is a cross sectional view on the line 2—2 in Fig. 1. Fig. 3 shows an alternative construction of the tire and felly in section.

A marks the felly or rim of the wheel; B, the outer covering or tire proper; and C, the air tube. The tire is preferably reinforced on its outer periphery or tread, and has its inner periphery slitted or separated circumferentially throughout its entire length, forming the edges B' B', which are slightly reinforced. Vulcanized into, or contained in an annular passage or channel in these edges are the chain bands, b b. These chains may be of any desired construction but I prefer the construction shown with the bent portion of each succeeding link passed through eyes in the ends of the preceding link. This style of chain which is usually made of stamped metal is very pliable, and has very little longitudinal give or stretch.

It is manifest that this tire may be attached to any of the different shaped fellies, to which tires, having an annulus of wire in their edges, may be attached. I prefer, however, the method of attachment shown in Figs. 1 and 2, as the best adapted to my construction.

The felly is slightly dished at the sides and has the centrally located annular groove, A,' as shown in section in Fig. 2. This central groove, A', is built up with a filling of rubber or other suitable material, $a$. The depressions, $a'$, are cut at intervals in the filling, $a$, and the "T" bolts, D, are passed through the felly at the centers of these depressions, and are secured on the inside of the felly by the nuts, $d$. The wings $d'$ $d'$, of the heads of bolts rest on and engage the edges of the tire, which are of just sufficient circumference to pass over the edges of the felly. When the bolts are tightened the edges are drawn into the depressions, $a'$. This takes up the slack in the chains and strains and holds them, and consequently the edges of the tire, in the smaller diameter at the center of the felly.

The number of depressions, $a'$, necessary, will depend upon their depth. It is manifest that the depressions may be extended by forming a cup or depression in the felly itself. It is also manifest that the depressions may be made wholly within the felly, and the filling, $a$, dispensed with.

To remove the tire, the bolts, D, are loosened. This allows the edges to be drawn out of the depressions, and they can then be readily drawn over the edge of the felly. To readjust the tire, the edges are placed under the wings of the heads of the bolts, D, and the bolts tightened. This draws the edges into the depressions, $a'$, and into the smaller diameter at the center of the felly, and fastens the tire securely in place.

The construction shown in Fig. 3 has a tire with the chain bands in its edges applied to a peculiar shaped felly now in use. In this construction, the felly has the central annular groove, A', and side annular grooves, $A^2$ $A^2$, in which the edges of the tire rest. They are held in position by the compressed air of the tube. The grooves, A' and $A^2$, are so proportioned as to their circumferences that, when the tire is collapsed and one of its edges on one side of the wheel is brought into the central groove A', the same edge at the other side of the wheel will pass over the outside of, and free from, the felly. The edge of the tire may then be drawn off the felly throughout the rest of its circumference. To replace the tire the operation is reversed.

The advantages of the chain over the wire commonly used, is its greater pliability, by reason of which it can be much more readily removed and readjusted, and the ease with which it can be re-joined when broken.

What I claim as new is—

1. In a pneumatic tire, the combination with the felly, of the tire, and a chain band on the inner periphery of said tire.

2. In a pneumatic tire, the combination with the felly of the tire having a peripheral slit in its inner periphery, and the chain bands at the edges of said tire for the purposes set forth.

3. In a pneumatic tire, the combination of the felly having transverse depressions therein, the tire having a peripheral slit in its inner periphery, the chain bands at the edges of said tire, and means for drawing them into said depressions and holding them for the purposes set forth.

4. In a pneumatic tire, the combination of the felly, A, having the annular groove, A', therein, filling $a$, in said groove having depressions, $a'$, therein, the tire having a peripheral slit on its inner periphery, inextensible and pliable edges thereon and means for drawing said edges into said depressions and holding them.

5. In a pneumatic tire, the combination of the felly, A, having groove, A', therein, filling, $a$, having depressions, $a'$, therein, tire B, chain bands $b$ in the edges thereof, and the "T" bolt D for drawing said edges in to said depressions.

In testimony whereof I affix my signature in presence of two witnesses.

JOSEPH G. MOOMY.

Witnesses:
WM. MARLES, Jr.,
H. C. LORD.